No. 640,577. Patented Jan. 2, 1900.
E. H. LUNKEN & H. RITTER.
BALANCED VALVE.
(Application filed Apr. 6, 1899.)
(No Model.)
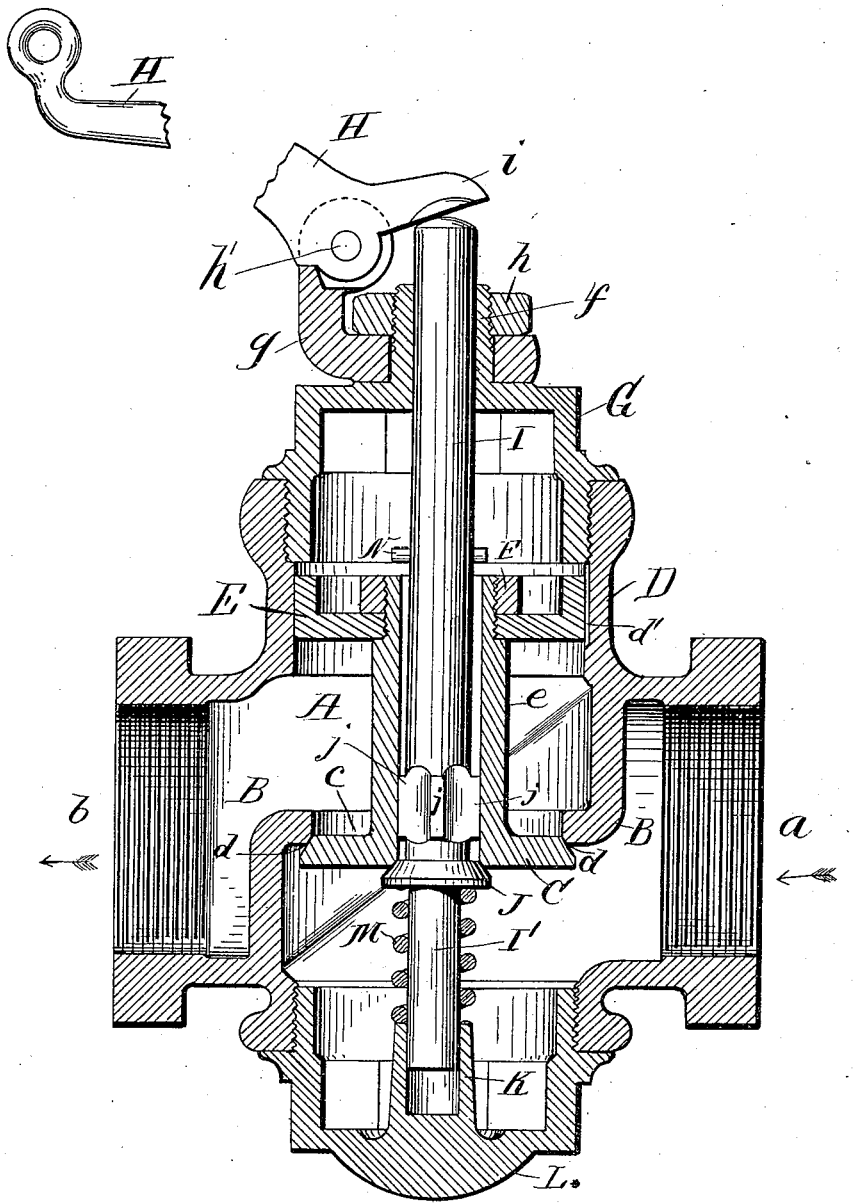
WITNESS
INVENTORS
Edmund H. Lunken
and Henry Ritter
their ATTORNEY

UNITED STATES PATENT OFFICE.

EDMUND H. LUNKEN, OF DENVER, COLORADO, AND HENRY RITTER, OF DELHI, OHIO, ASSIGNORS TO THE LUNKENHEIMER COMPANY, OF CINCINNATI, OHIO.

BALANCED VALVE.

SPECIFICATION forming part of Letters Patent No. 640,577, dated January 2, 1900.

Application filed April 6, 1899. Serial No. 711,957. (No model.)

*To all whom it may concern:*

Be it known that we, EDMUND H. LUNKEN, residing at Denver, in the county of Arapahoe and State of Colorado, and HENRY RITTER, residing at Delhi, in the county of Hamilton and State of Ohio, citizens of the United States, have invented certain new and useful Improvements in Balanced Valves, of which the following is a full, clear, and exact description, reference being had to the accompanying drawing, forming part of this specification.

Our invention relates to balanced valves designed more particularly for steam-whistles, though capable of use for other purposes where an easy and quick opening valve is required; and it has for its object the improved construction of such valves whereby their simplicity and cheapness of construction, as well as their efficiency, are greatly increased.

The novelty of our invention will be hereinafter set forth, and more specifically pointed out in the claims.

In the accompanying drawing the figure represents a central longitudinal section, in side elevation, of a valve embodying our invention.

A is the main shell or casing, having at one end an interiorly-threaded inlet-opening $a$ and at its opposite end an interiorly-threaded exit-opening $b$. There is a diaphragm B within this shell A, constructed after the manner of a globe-valve diaphragm and provided with an opening $c$, at the inlet side of which is a tapered valve-seat $d$. The main valve C is seated on this opening and has a tubular extension $e$ therethrough, which passes up into the bonnet D of the shell and has its upper end threaded to receive a cup-shaped piston E, which is screwed thereon and fits within the smooth tubular portion of the bonnet D, as shown. A nut F is screwed down upon the projecting end of the stem $e$ upon the piston D to hold the latter securely in place.

A tubular cap G is screwed into the threaded open end of the bonnet D and has a central aperture surrounded by a threaded boss or nipple $f$ to receive on its outside a bracket $g$, held in place by a nut $h$. The operating-lever H is pivoted to the bracket $g$, as at $h'$, and has a foot-piece $i$ bearing upon a stem I, which passes down through the nipple $f$, the chamber in the cap G, and the tubular opening in the stem $e$, which it does not entirely fill, and carries a valve J, which is seated against a tapering seat in the under side of the valve C. The stem I within the tubular stem $e$ is provided with guide-wings $j$, and beneath the valve J there is an extension I' of the stem I, which extends down and is guided in a socket K on the interior of a cap L, screwed into the lower end of the case A, the opening in the case being of sufficient size to permit the introduction of the valve C. A coiled spring M surrounds the extension I' of the stem I between the valve J and socket K to aid in holding the valve J closed against its seat and to return it thereto.

Passed through the stem I, slightly above the upper extension of the stem $e$, is a pin N, which when the stem I is pressed inward by the action of the lever H performs no function until the valve J is first unseated and opened and then comes in contact with the outer end of the stem $e$ and presses it inward to open the valve C. Instead of employing a pin N for this purpose any suitable projection, such as a nut or collar, might be employed, as will be readily understood.

We prefer that the area of the piston E on its upper surface should be larger than the area of the main valve C, so that the moment the secondary valve J is opened to admit steam into the inclosed chamber of the valve above the piston E the latter would be instantly acted upon to cause the automatic opening of the valve C. As this valve is to be used for a steam-whistle valve, it is necessary that means for positively opening the main valve should be provided. Otherwise should the said main valve stick in such a manner as to prevent it from being opened by steam-pressure the whistle will fail to blow, and this would be a serious objection in a valve-whistle where the sounding of the whistle when the valve is opened is an absolute necessity. The pin N or an equivalent projection on the lever-operated valve-stem I is therefore an essential requisite of this invention. We also provide a small channel $b'$ in the side wall of the bonnet D, so that when the valves C and J close any water of condensation can escape from the outer side of the piston E.

The spring M is of sufficient force not only to close the valve J, but also to close the valve C, when pressure is removed from the stem I.

It will be seen from the foregoing description and the construction of the parts that the moment the valve J is opened by the initial movement of the lever H steam will pass through the stem e above the piston E, which when of larger area than the valve C will overbalance the latter and cause its automatic opening and which when the piston E is not of sufficient area to cause the automatic opening of the valve C the pin N upon the further movement of the lever H exerts pressure upon the stem e and the valve C is opened without difficulty and with very slight draft on the lever H. Immediately upon the release of the lever H the valve J is closed by the action of the spring M, and the valve C is also carried to its seat, where it is held firmly by the pressure of the steam behind it, aided by the action of the spring M.

For a whistle-valve it is intended that the valve should stand with its inlet and outlet openings a b, respectively, vertical, and the base of the whistle is screwed either directly or by pipe connection into the outlet b.

Having thus fully described our invention, we claim—

1. The combination with a valve-casing provided with an inclosed chamber, of a main valve having a hollow stem carrying a piston arranged in said chamber, a secondary valve having a stem extending through the hollow stem of said main valve and also through said chamber and provided with means for positively operating said main valve after a certain limited movement of said secondary valve, and a lever for engaging the stem of said secondary valve, said lever having its fulcrum supported by the said valve-casing so that the balanced main valve may be positively opened thereby after the said secondary valve has been opened, should steam-pressure in said chamber fail to open said main valve.

2. The combination with a valve-casing provided with an inclosed chamber, of a main valve having a hollow stem carrying a piston arranged in said chamber, one face of said piston being open to the valve-outlet, a secondary valve having a stem extending through the hollow stem of said main valve and also through said chamber and provided with means for positively operating said main valve after a certain limited movement of said secondary valve, and a lever for engaging the stem of said secondary valve, said lever having its fulcrum supported by the said valve-casing so that the balanced main valve may be positively opened thereby after the said secondary valve has been opened, should steam-pressure in said chamber fail to open said main valve.

EDMUND H. LUNKEN.
HENRY RITTER.

Witnesses:
OWEN N. KINNEY,
EDWARD PECK.